(12) United States Patent
Guntoro et al.

(10) Patent No.: US 11,645,499 B2
(45) Date of Patent: May 9, 2023

(54) MODEL CALCULATING UNIT AND CONTROL UNIT FOR CALCULATING A NEURAL LAYER OF A MULTILAYER PERCEPTRON MODEL

(71) Applicant: Robert Bosch GmbH, Stuttgart (DE)

(72) Inventors: Andre Guntoro, Weil der Stadt (DE);
Ernst Kloppenburg, Ditzingen (DE);
Heiner Markert, Stuttgart (DE);
Martin Schiegg, Korntal-Muenchingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1098 days.

(21) Appl. No.: 16/466,814

(22) PCT Filed: Sep. 4, 2017

(86) PCT No.: PCT/EP2017/072058
§ 371 (c)(1),
(2) Date: Jun. 5, 2019

(87) PCT Pub. No.: WO2018/046425
PCT Pub. Date: Mar. 15, 2018

(65) Prior Publication Data
US 2021/0295133 A1      Sep. 23, 2021

(30) Foreign Application Priority Data
Sep. 7, 2016    (DE) .................. 102016216946.7

(51) Int. Cl.
*G06N 20/00* (2019.01)
*G06N 3/048* (2023.01)
(Continued)

(52) U.S. Cl.
CPC .......... *G06N 3/048* (2023.01); *F02D 41/266* (2013.01); *G05B 13/027* (2013.01); *G06N 3/063* (2013.01); *G06N 3/08* (2013.01)

(58) Field of Classification Search
None
See application file for complete search history.

(56) References Cited

U.S. PATENT DOCUMENTS

2017/0286860 A1* 10/2017 Chen .................. G06N 3/08

FOREIGN PATENT DOCUMENTS

DE       102013220432 A1    4/2015

OTHER PUBLICATIONS

Eppler et al, High Speed Neural Network Chip for Trigger Purposes in High Energy Physics, 1998, IEEE, pp. 1-8 (Year: 1998).*

(Continued)

*Primary Examiner* — David R Vincent
(74) *Attorney, Agent, or Firm* — Norton Rose Fulbright US LLP; Gerard Messina

(57) ABSTRACT

A model calculating unit for calculating a neural layer of a multilayer perceptron model having a hardwired processor core developed in hardware for calculating a definitely specified computing algorithm in coupled functional blocks. The processor core is designed to calculate, as a function of one or multiple input variables of an input variable vector, of a weighting matrix having weighting factors and an offset value specified for each neuron, an output variable for each neuron for a neural layer of a multilayer perceptron model having a number of neurons, a sum of the values of the input variables weighted by the weighting factor, determined by the neuron and the input variable, and the offset value specified for the neuron being calculated for each neuron and the result being transformed using an activation function in order to obtain the output variable for the neuron.

19 Claims, 3 Drawing Sheets

(51) Int. Cl.
　　　F02D 41/26　　　(2006.01)
　　　G05B 13/02　　　(2006.01)
　　　G06N 3/063　　　(2023.01)
　　　G06N 3/08　　　(2023.01)

(56) References Cited

OTHER PUBLICATIONS

International Search Report for PCT/EP2017/072058, dated Nov. 20, 2017.
Richard Fiifi Turkson et al., "Artificial Neural Network Applications in the Calibration of Spark-Ignition Engines: An Overview", Engineering Science and Technology, an International Journal, vol. 19, No. 3, 2016, pp. 1346-1359, XP055420859.
"Introduction to Interpolated Neural Networks", APR Power White Paper, 2009, pp. 1-57, XP055420876.
Eppler W et al., "High Speed Neural Network Chip for Trigger Purposes in High Energy Physics" Design, Automation and Test in Europe, 1998, pp. 108-115.

* cited by examiner

MODEL CALCULATING UNIT AND CONTROL UNIT FOR CALCULATING A NEURAL LAYER OF A MULTILAYER PERCEPTRON MODEL

FIELD

The present invention relates to the calculation of functional models in a separate hardwired model calculating unit, in particular for calculating multilayer perceptron models.

BACKGROUND INFORMATION

Functions of control units of technical system such as, e.g., internal combustion engines, electrical drives, battery stores and the like are frequently implemented using models that represent a mathematical representation of the real system. In physical models, however, especially in complex contexts, there is a lack of required precision in the calculation, and it is normally difficult, given today's computing capacities, to calculate such models within the real-time requirements demanded for a control unit. For such cases, a use of data-based models is contemplated that describe relationships between an output variable and input variables exclusively on the basis of training data obtained with the aid of a test stand or the like. Particularly suitable are data-based models for modeling complex relationships, in which multiple input variables, between which there exist reciprocal relationships, are taken into account in the model in a suitable manner. Modeling with the aid of data-based models additionally offers the possibility of complementing the model by adding individual input variables.

Data-based functional models are normally based on a great number of supporting points in order to achieve a modeling precision that is sufficient for the respective application. Due to the great number of supporting points, a high computing capacity is required for calculating a model value using a data-based functional model such as for example a Gaussian process model. In order to be able to calculate such a data-based functional model in a control unit application in real time, model calculating units based on a hardware design may therefore be provided.

SUMMARY

The present invention provides a model calculating unit for calculating a layer of a multilayer perceptron model, as well as a control unit and a use of the control unit.

Additional developments of the present invention are described herein.

The model calculating unit mentioned above provides an embodiment that makes it possible to calculate a layer of a multilayer perceptron model (MLP model) having a variable number of neurons.

According to a first aspect of the present invention, a model calculating unit is provided for calculating a layer of a multilayer perceptron model having a hardwired processor core developed in hardware for calculating a definitely specified computing algorithm in coupled functional blocks, the processor core being designed to calculate, as a function of one or multiple input variables of an input variable vector, of a weighting matrix having weighting factors and an offset value specified for each neuron, an output variable for each neuron for a neural layer of a multilayer perceptron model having a number of neurons, a sum of the values of the input variables weighted by the weighting factor, determined by the neuron and the input variable, and the offset value specified for the neuron being calculated for each neuron and the result being transformed using an activation function in order to obtain the output variable for the neuron.

One aspect of the above model calculating unit is to develop it in hardware structures separately in a processor core in a control unit for calculating a layer of a multilayer perceptron model. In this manner, it is possible to provide an essentially hardwired hardware circuit for implementing functions that makes it possible to calculate one or multiple neural layers of a multilayer perceptron model and in the process to produce only a very small processing load in a software-controlled microprocessor of a control unit. The hardware acceleration that is provided by the model calculating unit makes it possible to calculate a multilayer perceptron model in real time so that the use of such a model becomes interesting for control unit applications for internal combustion engines in motor vehicles.

In addition, the use of multilayer perceptron models allows for a data-based modeling using a smaller number of supporting points than comparable data-based models such as a Gaussian process model, for example.

The model calculating unit may be equipped with interfaces in order to calculate the MLP model in layerwise fashion so that the number of neural layers and the number of neurons may be freely selected in each neural layer. This layerwise division makes it possible to specify the parameters, such as for example the synapse weightings, separately for each neural layer.

The processor core may furthermore comprise a state machine, a memory for storing the one or multiple input variables of the input variable vector, the weighting matrix, the offset values specified for each neuron and the output variables for each neuron, one or multiple computing operation blocks, in particular a MAC block (for fixed point or floating point calculations) and an activation function calculation block.

There may be a provision for the processor core to be designed to select, as a function of a selection variable, the type of activation function for the multilayer perceptron model and/or to select, with the aid of another selection variable, whether a Gaussian process model or an RBF model or a neural layer of the perceptron model is to be calculated.

The activation function may comprise for example a kink function, a sigmoid function, a hyperbolic tangent function or a linear function.

The processor core furthermore may be developed in a surface area of an integrated chip.

According to another aspect of the present invention, a control unit having a microprocessor and the above model calculating unit is provided. The control unit may be designed in particular as an integrated circuit.

According to another aspect of the present invention, a use of the above control unit is provided as a control unit for controlling an engine system in a motor vehicle.

BRIEF DESCRIPTION OF THE DRAWINGS

Specific embodiments are explained in greater detail below on the basis of the figures.

DETAILED DESCRIPTION OF EXAMPLE EMBODIMENTS

Figure 1:
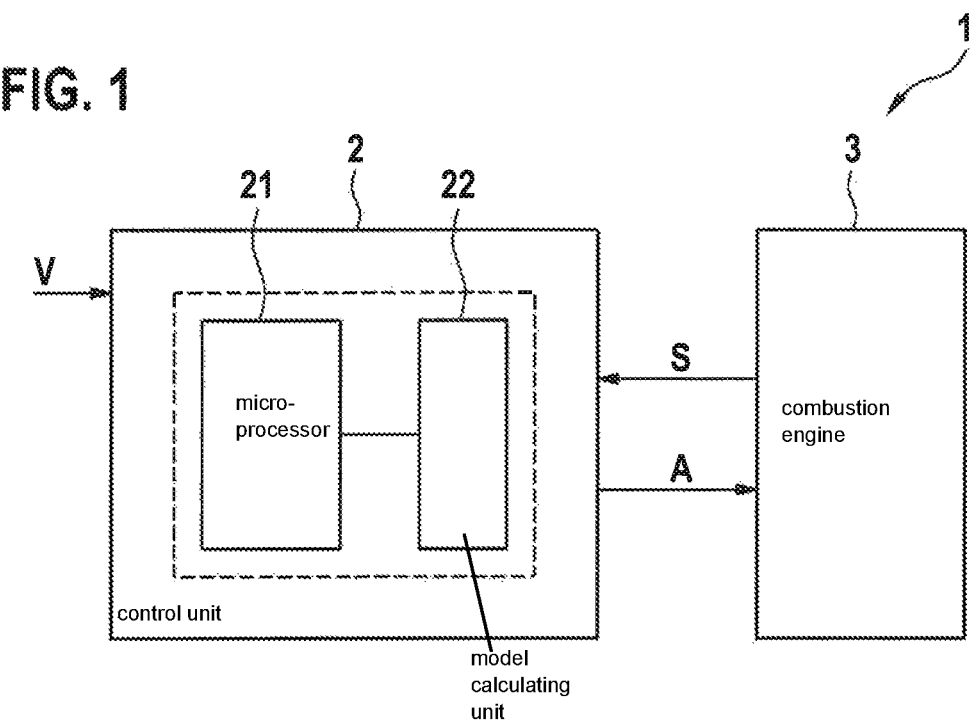
FIG. 1 shows a schematic representation of a control unit for use for an engine system in a motor vehicle.

FIG. 1 shows in exemplary fashion a schematic representation of a control unit 2 for an engine system 1 having a combustion engine 3 as a technical system to be controlled. Control unit 2 comprises a microprocessor 21 and a model calculating unit 22, which may be developed as separate components or in integrated fashion in separate surface areas on a chip. In particular, model calculating unit 22 represents a hardware circuit, which may be structurally separate from a processor core of microprocessor 21.

Model calculating unit 22 is essentially hardwired and is accordingly not designed like microprocessor 21 to execute a software code and thereby to execute a variable function specified by software. In other words, no processor is provided in model calculating unit 22 so that the latter is not able to be operated by a software code. Focusing on a specified model function allows for a resource-optimized implementation of such a model calculating unit 22. In an integrated structural design, the model calculating unit 22 may be implemented in surface area-optimized fashion, which additionally allows for fast calculations.

Control unit 2 is essentially used to process sensor signals S or sensor variables, which are recorded by a sensor system in internal combustion engine 3, and/or external inputs V, and to apply, cyclically at definitely specified time intervals of e.g. 1-100 ms or in angular synchronous manner as a function of a crankshaft angle of an operated internal combustion engine, values of one or multiple corresponding control variables A to internal combustion engine 3 so that the latter may be operated in a manner known per se.

Figure 2:
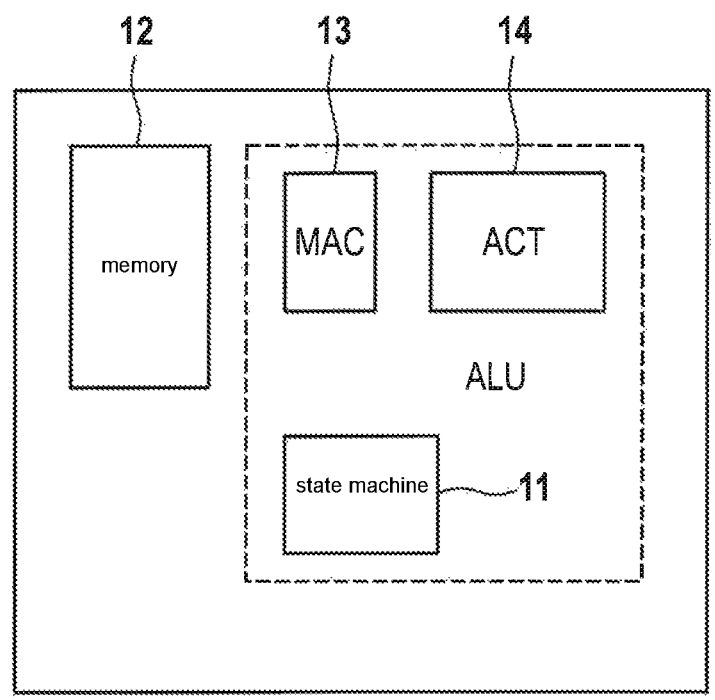
FIG. 2 shows a schematic representation of a calculating unit as part of the control unit.

FIG. 2 shows a model calculating unit 22 in more detail. Model calculating unit 22 comprises a state machine 11, a memory 12 and one or multiple operation blocks, which may include for example one or multiple MAC blocks 13 (MAC: Multiply ACumulate for fixed point calculation or FMA: Fused Multiply Add for floating point calculation) and an activation function calculation block (ACT) 14 for calculating an activation function. State machine 11 and the one or the multiple operation blocks 13, 14 form a processor core ALU of model calculating unit 22. In addition or as an alternative to the MAC block, the operation blocks may comprise a multiplication block and an addition block.

With the aid of state machine 11, values of input variables stored in an input variable memory area of memory 12 may be calculated by repeated loop calculations in order to obtain intermediate variables or output variables that are written into a corresponding output variable memory area of memory 12.

State machine 11 is designed to calculate an individual neural layer of a multilayer perceptron model. State machine 11 may be described according to the following pseudocode:

```
/*input transformation*/
for (k=0; k<p7; k++) {
  ut[k]=u[k]*p1[k]+p2[k];
}
/*loop calculation*/
for (j=p8; j<p6; j++) {
  i=j*p7;
  t=p3[j];
  for (k=0; k<p7; k++) {
    t+=V[i+k]*ut[k];
  }
  y[j]=act(t);
}
/*output transformation*/
for (k=0; k<p6; k++) {
  z[k]=y[k]*p4[k]+p5[k];
}
``` where p7: maximum index value for the input variables of the input variable vector p8: minimum index value or initial value for the number of neurons p6: maximum index value for the number of neurons p3: offset value p1, p2: variables for the input transformation p4, p5: variables for the output transformation With the aid of the above pseudocode, it is possible to perform the following calculation for each neuron of the neural layer to be calculated:

$$y[j] = \text{act}\left(p3[j] + \sum_{k=0}^{p7-1} v_{j,k} * ut[k]\right) \text{ for } j = 0 \ldots p6-1$$

Figure 3:
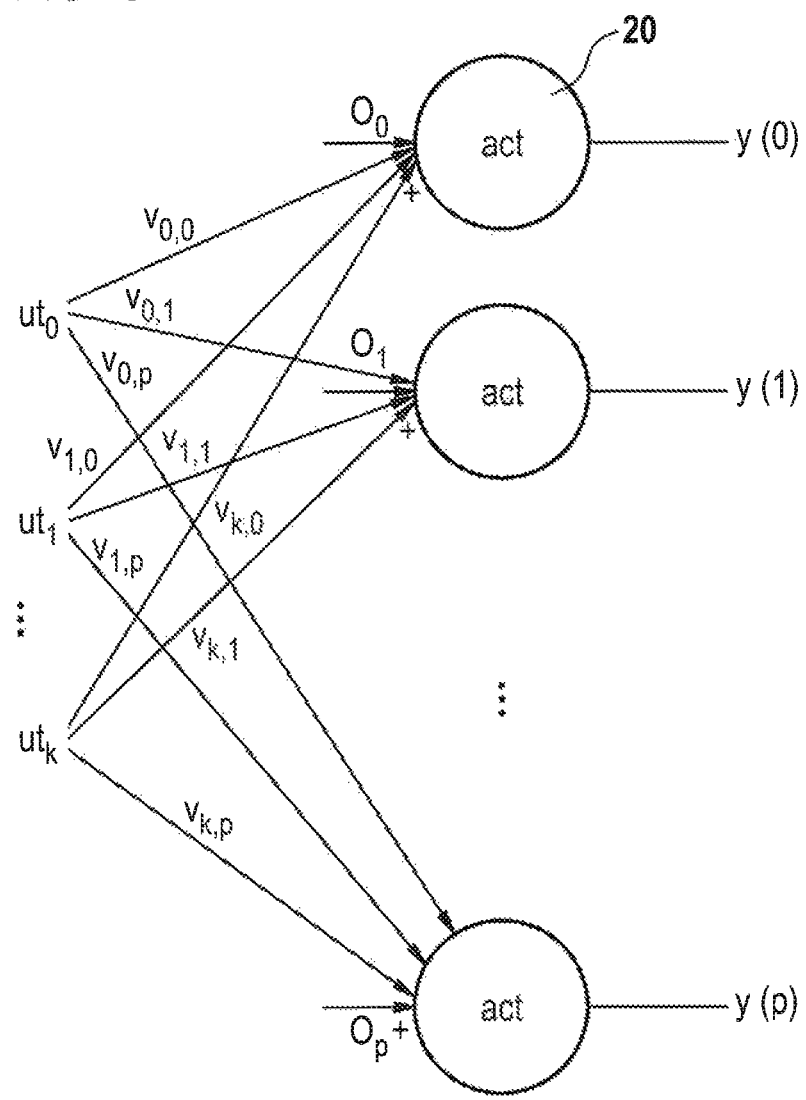
FIG. 3 shows a schematic representation of a neural layer of an MLP model.
Figure 4A:
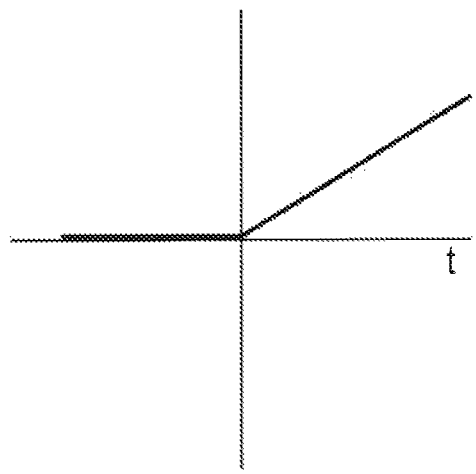
FIGS. 4a-4d show representations of possible activation functions.
Figure 4B:
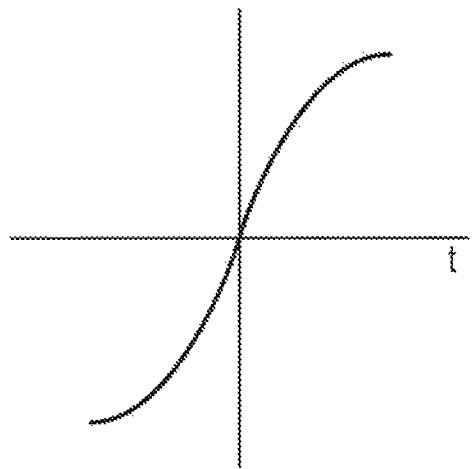
Figure 4C:
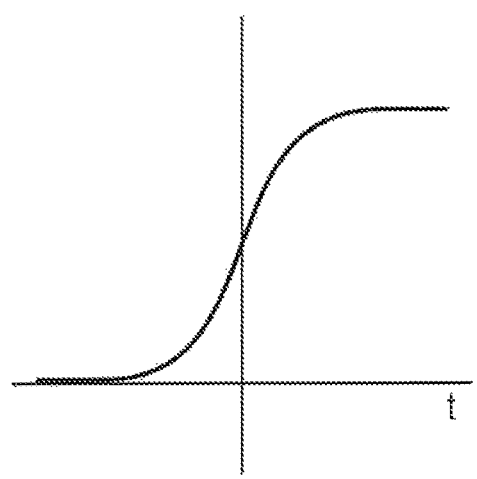
Figure 4D:
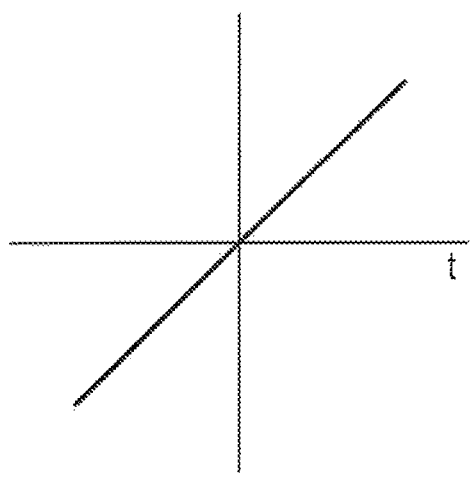

This represents a calculation for a neural layer of a multilayer perceptron model, as shown in FIG. 3.

FIG. 3 shows a neural layer of multiple neurons 20 which are supplied with values of input variables of an input variable vector $ut_0 \ldots ut_{p6-1}$. The values of the input variables are weighted with the aid of a respectively specified weighting matrix of weighting values, which are specified as weighting factors $v_0 \ldots _{p7-1,0} \ldots _{p6-1}$. The weighting normally occurs by multiplicative application of the associated weighting factors $v_0 \ldots _{p7-1,0} \ldots _{p6-1}$, but may also apply the values of the input variable vector in another manner.

The sums of the weighted values of the input variable vector $ut_0 \ldots ut_{p6-1}$ respectively have an offset value $O_0 \ldots O_{p6-1}$ applied to them, in particular applied in an additive manner. The result is transformed using a specified activation function "act". As a result, one obtains a corresponding value of an output variable vector $y_0 \ldots y_{p6-1}$ The provision of the offset value for each neuron provides another degree of freedom for the model formation.

Defining the controlled variables p6 makes it possible to set the number of neurons 20 of the neural layer to be calculated.

By using the values of the output variable vector $y_0 \ldots y_{p6-1}$ of a neural layer as input variable vector for calculating a subsequent neural layer, a multilayer perceptron model may be used in model calculating unit 22 so that the number of neural layers of the multilayer perceptron model may be implemented by repeatedly calling the function according to the above pseudocode or by repeatedly calling the model calculating unit 22 with accordingly changed parameters.

An input and/or output transformation of the input variables of the input variable vector and, respectively, of the output variables of the output variable vector may be performed with the aid of scaling variables p1 and p2, and, respectively, p4 and p5, specified for each neuron.

The layerwise calculation of the MLP model allows for a slim design of model calculating unit 22 so that its surface area requirement in an integrated structural design is low. Model calculating unit 22 nevertheless allows for a calculation of a multilayer perceptron model in a simple manner by returning or redefining the values of the output variables of the output variable vector as input variables of an input variable vector for the calculation of a further neural layer.

As activation function "act," one of several activation functions may be provided, one of which may be calculated by the activation function calculation block 14 of model calculating unit 22. The activation functions may be for example a kink function, a sigmoid function, a hyperbolic tangent function or a linear function, as shown respectively in FIGS. 4*a* through 4*d*.

The single-layer design of the neural model, which is implemented by the above pseudocode, additionally makes it possible to calculate, in addition to a neural layer of an MLP model, also a Gaussian process model or an RBF model (RBF: Radial Basis Function). For this purpose, the weighting values are not applied multiplicatively onto the values of the input variable, but rather additively or subtractively. Furthermore, the quadratic distance is calculated, which is weighted using specified length scales L[k]. Furthermore, an exponential function is selected as activation function for the RBF model. This makes it possible to calculate a Gaussian process model in accordance with $$y = \sum_{j=0}^{p6-1} p3[j] \cdot \exp\left(-\sum_{k=0}^{p7-1} L[k] \cdot (-v_{j,k} + ut[k])^2\right)$$

selectively by a modification of the pseudocode as follows.

```
/*input transformation*/
for (k=0; k<p7; k++) {
ut[k]=u[k]*p1[k]+p2[k];
}
/*loop calculation*/
for (j=p8; j<p6; j++) {
i=j*p7;
t=(cfg_mlp) ? p3[j]:0.0f; // init with bias for MLP
for (k=0; k<p7; k++) {
   if (cfg_mlp) {
      t+=V[i+k]*ut[k];
   }
   else {
      d=V[i+k]−ut[k];
      d=d*d;
      t+=L[k]*d
   }
}
if (cfg_mlp) {
   switch (cfg_activation_function) {
   case 1:
      e=(t>=0.0f) ? t:0.0f; // kink function
      break;
   case 2: // sigmoid function
      e=sigmoid(t);
      break;
   case 3: // tan h function
      e=tan h(t);
      break;
   default: // linear function
      e=t;
   }
   y[j]=e;
}
else {// for Gaussian process model/RBF model
   e=exp(−t);
   y[0]+=p3[j]*e;
}
}
/*output transformation*/
j=(cfg_mlp) ? p6:1;
for (k=0; k<j; k++) {
z[k]=y[k]*p4[k]+p5[k];
}
```

It may be seen that in the execution of the loop function it is possible to perform a case distinction using variable cfg_mlp. At cfg_mlp=1, the calculation of the neural layer is selected and using cfg_activation_function=0 . . . 3 the type of the activation functions described above may be selected.

At cfg_mlp=0, a Gaussian process model or an RBF model is calculated. Here a selection of the activation function is not necessary since it may always be calculated using the exponential function. In this manner, it is possible to use model calculating unit 22 both for calculating Gaussian process models and RBF models as well as for calculating a neural layer of an MLP model and to require in the process only a small surface area in an integrated construction of the state machine.

What is claimed is:

1. A model calculating unit for calculating a layer of a multilayer perceptron model, comprising:
  a hardwired processor core configured in hardware to calculate a definitely specified computing algorithm in coupled functional blocks, the processor core being configured to calculate an output variable for each neuron for a neural layer of the multilayer perceptron model having a number of neurons as a function of: (i) one or multiple input variables of an input variable vector, (ii) a weighting matrix having weighting factors, and (iii) an offset value specified for each of the neurons, a sum of the values of the input variables, weighted by a weighting factor determined by the neuron and the input variable, and the offset value specified for the neuron being calculated for each neuron, and a result being transformed using an activation function to obtain the output variable for the neuron;
  wherein the model calculating unit includes at least one of the following features (a)-(b):
    (a) the functional blocks include a state machine hardwired such that the state machine is configured to at least one of: (1) select between implementing the multilayer perceptron model and at least one alternative model based on a first received input variable, and (2) select between implementing different activation functions with the multilayer perceptron model based on a second received input variable; and
    (b) the processor core is configured to base the calculation of the output variable on distance values that are a function of respective distances of respective neuron values of the neurons from the values of the input variable vector, with a weighting of the distance values by respective length scales assigned to respective ones of the neurons.

2. The model calculating unit as recited in claim 1, wherein the processor core includes the state machine, a memory to store the one or multiple input variables of the input variable vector, the weighting matrix, the offset values specified for each neuron, and the output variables for each neuron, and one or multiple computing operation blocks, the computing operating blocks including a MAC block, and an activation function calculation block.

3. The model calculating unit as recited in claim 1, wherein the processor core is developed in a surface area of an integrated chip.

4. The model calculating unit as recited in claim 1, wherein the processor core is configured to base the calculation of the output variable on the distance values that are a function of the respective distances of the respective neuron values of the neurons from the values of the input variable vector, with the weighting of the distance values by the respective length scales assigned to the respective ones of the neurons.

5. The model calculating unit as recited in claim 4, wherein the distance values are quadratic distance values.

6. The model calculating unit as recited in claim 4, wherein the distance values are squares of the respective distances.

7. The model calculating unit as recited in claim 1, wherein the functional blocks include the state machine, the state machine being hardwired such that the state machine is configured to select between the implementing of the multilayer perceptron model and the at least one alternative model based on the first received input variable.

8. The model calculating unit as recited in claim 7, wherein the state machine is hardwired such that the state machine is configured to, when the multilayer perceptron model is selected instead of the at least one alternative model, additionally select between the implementing of the different activation functions with the multilayer perceptron model based on the second received input variable.

9. The model calculating unit as recited in claim 8, wherein the at least one alternative model includes at least one of a Gaussian process model and a Radial Basis Function (RBS) model.

10. The model calculating unit as recited in claim 8, wherein the processor core is configured to base the calculation of the output variable on the distance values that are a function of the respective distances of the respective neuron values of the neurons from the values of the input variable vector, with the weighting of the distance values by the respective length scales assigned to the respective ones of the neurons.

11. The model calculating unit as recited in claim 7, wherein the at least one alternative model includes at least one of a Gaussian process model and a Radial Basis Function (RBS) model.

12. The model calculating unit as recited in claim 11, wherein the different activation functions, between which the state machine is configured to select, include a kink function, a sigmoid function, a hyperbolic tangent function, and a linear function.

13. The model calculating unit as recited in claim 7, wherein the processor core is configured to base the calculation of the output variable on the distance values that are a function of the respective distances of the respective neuron values of the neurons from the values of the input variable vector, with the weighting of the distance values by the respective length scales assigned to the respective ones of the neurons.

14. The model calculating unit as recited in claim 1, wherein the functional blocks include the state machine, the state machine being hardwired such that the state machine is configured to select between the implementing of the different activation functions with the multilayer perceptron model based on the second received input variable.

15. The model calculating unit as recited in claim 14, wherein the processor core is configured to base the calculation of the output variable on the distance values that are a function of the respective distances of the respective neuron values of the neurons from the values of the input variable vector, with the weighting of the distance values by the respective length scales assigned to the respective ones of the neurons.

16. A control unit, comprising:
a microprocessor; and
one or multiple model calculating units for calculating a layer of a multilayer perceptron model, each of the model calculating units including a hardwired processor core configured in hardware to calculate a definitely specified computing algorithm in coupled functional blocks, the processor core being configured to calculate an output variable for each neuron for a neural layer of the multilayer perceptron model having a number of neurons as a function of: (i) one or multiple input variables of an input variable vector, (ii) a weighting matrix having weighting factors, and (iii) an offset value specified for each of the neurons, a sum of the values of the input variables, weighted by a weighting factor determined by the neuron and the input variable, and the offset value specified for the neuron being calculated for each neuron, and a result being transformed using an activation function to obtain the output variable for the neuron;
wherein the model calculating unit includes at least one of the following features (a)-(b):
(a) the functional blocks include a state machine hardwired such that the state machine is configured to at least one of: (1) select between implementing the multilayer perceptron model and at least one alternative model based on a first received input variable, and (2) select between implementing different activation functions with the multilayer perceptron model based on a second received input variable; and
(b) the processor core is configured to base the calculation of the output variable on distance values that are a function of respective distances of respective neuron values of the neurons from the values of the input variable vector, with a weighting of the distance values by respective length scales assigned to respective ones of the neurons.

17. The control unit as recited in claim 16, wherein the control unit is developed as an integrated circuit.

18. A control unit, comprising:
a microprocessor; and
one or multiple model calculating units for calculating a layer of a multilayer perceptron model, each of the model calculating units including a hardwired processor core configured in hardware to calculate a definitely specified computing algorithm in coupled functional blocks, the processor core being configured to calculate an output variable for each neuron for a neural layer of the multilayer perceptron model having a number of neurons as a function of: (i) one or multiple input variables of an input variable vector, (ii) a weighting matrix having weighting factors, and (iii) an offset value specified for each of the neurons, a sum of the values of the input variables, weighted by a weighting factor determined by the neuron and the input variable, and the offset value specified for the neuron being calculated for each neuron, and a result being transformed using an activation function to obtain the output variable for the neuron;
wherein the control unit is a control unit configured to control a combustion engine system in a motor vehicle using sensor signals from the engine system to form input variable vector and using the output variables to form control variables output to the engine system.

19. The control unit as recited in claim 18, wherein the control unit is configured to output the control variables using the multilayer perceptron model cyclically as a function of a crankshaft angle of the engine system.

\* \* \* \* \*